(12) United States Patent
Spranger et al.

(10) Patent No.: US 9,209,716 B2
(45) Date of Patent: Dec. 8, 2015

(54) METHOD AND CONTROL UNIT FOR DETECTING A BLOCKED ELECTRIC MACHINE IN AN ELECTRIC VEHICLE

(75) Inventors: Joerg Spranger, Gerlingen (DE); Johannes Heusser, Ilsfeld (DE); Julian Doerreich, Stuttgart (DE); Stefan Mangold, Stuttgart (DE); Martin Wirth, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/116,017

(22) PCT Filed: Mar. 20, 2012

(86) PCT No.: PCT/EP2012/054882
§ 371 (c)(1),
(2), (4) Date: Nov. 6, 2013

(87) PCT Pub. No.: WO2012/156129
PCT Pub. Date: Nov. 22, 2012

(65) Prior Publication Data
US 2014/0070748 A1 Mar. 13, 2014

(30) Foreign Application Priority Data
May 16, 2011 (DE) .......................... 10 2011 075 869

(51) Int. Cl.
*H02P 1/04* (2006.01)
*H02P 1/02* (2006.01)
(Continued)

(52) U.S. Cl.
CPC .............. *H02P 1/028* (2013.01); *B60L 3/0061* (2013.01); *B60L 3/06* (2013.01); *B60L 15/2054* (2013.01);
(Continued)

(58) Field of Classification Search
CPC ......... H02P 1/18; H02P 6/14; H02P 2209/07; B66B 1/28; G11B 19/20
USPC ........................................... 318/431
See application file for complete search history.

(56) References Cited

U.S. PATENT DOCUMENTS
2005/0184529 A1* 8/2005 Ueda ........................... 290/40 C
2009/0066274 A1* 3/2009 Liu et al. ...................... 318/383

FOREIGN PATENT DOCUMENTS
CN 101449457 6/2009
CN 101977790 2/2011
(Continued)

OTHER PUBLICATIONS
International Search Report for Application No. PCT/EP2012/054882 dated Jan. 2, 2013 (English Translation, 3 pages).

*Primary Examiner* — Kawing Chan
*Assistant Examiner* — Bradley Brown
(74) *Attorney, Agent, or Firm* — Michael Best & Friedrich LLP

(57) ABSTRACT

The invention relates to a method and a control unit, which makes it possible to reliably detect in an electric vehicle whether or not an electric machine is in a blocked state. For this purpose, a current rotational speed of the electric machine (1) is monitored using a control unit (7). If a non-rotating state is detected, the electric machine (1) is actuated specifically for increasing a torque. The current rotational speed is further monitored, in particular for an increase of the current rotational speed of the electric machine, at least a short-term one, for tensioning a drive train (3) against a wheel (5) blocked due to external influences, for example. If this is not the case, it is assumed that the electric machine (1) is blocked, and a corresponding blocking signal is generated. If the electric machine (1) is detachably connected to the wheel (5) via a coupling (19), it can be additionally provided that once the non-rotating state is detected, the coupling (19) is disengaged in order to see if the electric machine (1) will react to a request for an increased torque with an increased rotational speed, or if this does not happen due to a blocked electric machine.

8 Claims, 3 Drawing Sheets

(51) Int. Cl.
  B60L 3/00   (2006.01)
  B60L 3/06   (2006.01)
  B60L 15/20  (2006.01)
  H02P 6/14       (2006.01)
  H02P 1/18       (2006.01)

(52) U.S. Cl.
  CPC ........ *B60L 2220/46* (2013.01); *B60L 2240/421* (2013.01); *B60L 2240/423* (2013.01); *B60L 2240/461* (2013.01); *B60L 2240/507* (2013.01); *B60L 2240/80* (2013.01); *H02P 1/18* (2013.01); *H02P 6/14* (2013.01); *Y02T 10/642* (2013.01); *Y02T 10/7275* (2013.01)

(56) References Cited

FOREIGN PATENT DOCUMENTS

| | | |
|---|---|---|
| DE | 102008054424 | 6/2010 |
| EP | 2244370 | 10/2010 |
| JP | 2003134601 | 5/2003 |
| JP | 2009232543 | 10/2009 |

* cited by examiner

METHOD AND CONTROL UNIT FOR DETECTING A BLOCKED ELECTRIC MACHINE IN AN ELECTRIC VEHICLE

BACKGROUND OF THE INVENTION

The invention relates to a method and to a control unit for permitting reliable detection of a blocked electric machine in an electric vehicle.

In electric vehicles or hybrid vehicles, an electric machine which can usually be operated either in a drive mode or in a generator mode is generally connected to one or more wheels of the vehicle. The electric machine in this context can be connected directly and rigidly to the wheel or the wheels since, in contrast to internal combustion engines, it can be stopped completely and set in rotation against at any time. However, in particular in the case of hybrid vehicles in which, in addition to the electric machine, an internal combustion engine for driving the vehicle is also provided, it can be advantageous not to connect the electric machine directly to the wheel or the wheels but instead via a clutch. In this way, in particular in a driving state in which the vehicle is to be driven only by the internal combustion engine, the electric machine can be decoupled from the rotating wheels and in this way power losses as a result of the electric machine being entrained are avoided.

Synchronous machines, such as are used typically nowadays in electric vehicles or hybrid vehicles, have a rotor which can rotate within a stator. In this context, the rotor is separated from the stator only by a small gap. It has been observed that, for example in the cases of extreme stress or severe wear, the rotor can become blocked within the stator. Since such blockage can lead to blockage of the wheels coupled to the electric machine and therefore to dangerous driving situations and to more wide-ranging damage to the electric machine or to the entire vehicle, the electric machine should be reliably and continuously be monitored for the occurrence of blockage.

SUMMARY OF THE INVENTION

There is therefore a need for a method and/or a control unit which can be used in an electric vehicle for reliably detecting blockage in an electric machine.

The invention can be considered, inter alia, to be based on the following realizations and ideas: electric machines in electric vehicles are usually controlled by a control unit which can transmit to the electric machine a setpoint rotational speed signal or a signal for requesting increased torque, depending on the requirements of the driver. As a result, the electric power which is made available to the electric machine is correspondingly increased. As a result of this, the rotational speed of the electric machine is subsequently increased in a normal driving state. The actual rotational speed of the electric machine is determined at regular time intervals here and signaled back to the control unit. In this way, a desired rotational speed can be set.

During a normal driving state of the vehicle, there can always be slight fluctuations in the rotational speed of the electric machine. Such fluctuations in the rotational speed can be caused, for example, by the fact that the electric machine is approximately rigidly connected to the vehicle wheels in order to drive them. Owing to, for example, unevennesses in the roadway, the rotational speed of the wheels can briefly change as a result of external influences, wherein this change in the rotational speed can be transmitted directly to the electric machine. In order to avoid problems with the control of the rotational speed of the electric machine owing to such brief fluctuations in the rotational speed, a provision is therefore typically made to ignore brief fluctuations in the rotational speed during the control of the electric machine. This provision may, for example, average an actual rotational speed of the electric machine over a time period which is longer than the duration of typical fluctuations in rotational speed which are caused by the wheels.

It has now been recognized that by using conventional control units it has not been possible to reliably detect blockage of the electric machine occurring as a malfunction, or it has only been possible to detect such blockage by using additional technical means. Although it has been possible to detect if the actual rotational speed did not actually increase despite the actuation of the electric machine with an increased setpoint rotational speed, it has not been possible to detect whether such a deficient reaction resulted from blockage of the electric machine or whether other reasons could be responsible for this. For example, it has not been possible to detect whether the fact that a vehicle does not start to move when there is an increased power supply to the electric machine when the vehicle is stationary results from the electric machine being blocked or from the fact that the vehicle is, for example, located in front of an obstacle such as, for example, a curve, or a parking brake is locked, or an attempt is being made to drive uphill.

Owing to a deficient capability of reliably being able to differentiate between blockage of the electric machine owing to damage within the electric machine, on the one hand, and a continuous stationary state of the electric machine owing to external influences in the case of an intact electric machine, on the other, it has been possible for incorrect actuation of the electric machine to occur, resulting in damage to the electric machine and/or the vehicle.

Now, a method is proposed here for reliably detecting a blocked electric machine in an electric vehicle, wherein the method comprises the method steps described below.

First, an actual rotational speed of the electric machine, that is to say a rotational speed of the electric machine which is currently actually present is continuously monitored. To do this, for example a suitable sensor can be coupled to the electric machine, said sensor continuously determining information about the actual rotational speed and supplying it to a monitoring unit. This monitoring unit is configured to detect if the electric machine is in a non-rotating state. This non-rotating state can serve as a first indication of a possibly blocked electric machine. If such a non-rotating state is detected, the electric machine is selectively actuated to generate an increased torque by increasing the supply of power to the electric machine. Subsequent to such actuation, the actual rotational speed of the electric machine continues to be monitored. In the event of it being detected here that the actual rotational speed of the electric machine does not increase at least during a brief time period despite this actuation, a blockage signal is output. This blockage signal indicates that the electric machine is blocked owing to, for example, a mechanical fault.

The proposed method is based on the realization that in the case of an intact, non-blocked electric machine there is always at least briefly an increase in the actual rotational speed of the electric machine when the supply of electric power is increased. Even in the event of the wheels which are coupled to the electric machine being blocked owing to external influences, there is a brief increase in the actual rotational speed of the electric machine since a drive train between the electric machine and the wheels connected thereto can never be completely rigid and therefore when the torque which is applied by the electric machine is increased the drive train becomes taut and at the same time there is a brief increase in the rotational speed of the electric machine.

The objective is therefore to ensure that a monitoring unit which is used to carry out the proposed method determines the actual rotational speed of the electrical machine at sufficiently brief time intervals so that it is possible to detect if the actual rotational speed increases briefly during a brief time period which the drive train typically takes to become taut directly after the actuation owing to the increased torque. Such a brief time period can be in the range from less than 5 s, preferably less than 2 s, alternatively less than 0.2 s. Correspondingly, it may be necessary to measure the actual rotational speed after the request of an increased setpoint rotational speed at time intervals of, for example, less than 10 ms, i.e. with a sufficient frequency of, for example, more than 100 Hz, so that a very brief increase in the actual rotational speed cannot remain undetected. If an increase in the actual rotational speed is detected directly subsequent to the increase in the supply of power to the electric machine as a result of selective actuation thereof within such a brief time period, it is possible to assume that the electric machine is not blocked. If an increase in the actual rotational speed does not occur even within this brief time period, it is possible to assume that the electric machine is damaged and that there is probably blockage between the rotor and the stator of the electric machine.

The blockage signal which is to be output in this case can be used within the control unit or by transmission to other devices within the vehicle to trigger suitable reactions to the blocked electric machine. For example, a driver assistance system can be instructed to assist the driver in stabilizing the vehicle if, owing to the blocked electric machine, the wheels connected thereto are also blocked and therefore the vehicle is destabilized.

In order to be able to monitor the actual rotational speed of the electric machine directly after the targeted actuation in order to increase the rotational torque within the abovementioned brief time period, it may, under certain circumstances, be necessary to deactivate a provision to ignore brief fluctuations in the rotational speed, which is otherwise active during the normal operation of the electric machine. It is therefore possible, for example, to ensure that the actual rotational speed is no longer averaged over a time period which is longer than a time period which is necessary to make the drive train taut, with the result that a very brief increase in the actual rotational speed can also be detected.

In one specific embodiment, the proposed method is adapted to electric vehicles in which the electric machine can be connected to at least one of the wheels of the vehicle via a releasable clutch.

In this case, during the detection as to whether the electric machine is in a non-rotating state it is possible to selectively actuate this clutch to disconnect the connection between the electric machine and the wheel. At the same time or subsequently, the electric machine can in turn be actuated to generate an increased torque. Subsequently, the actual rotational speed of the electric machine is monitored when the clutch is disconnected. If the electric machine is not blocked, the rotational speed of the electric machine should increase after the actuation. If no increase in the actual rotational speed is detected, the blockage signal is output.

In this embodiment of the proposed method it is not absolutely necessary to monitor the actual rotational speed of the electric machine at very brief time intervals, that is to say within a very brief period of time directly after the actuation of the electric machine. Since external influences on the wheels owing to the disconnected clutch can no longer influence the actual rotational speed of the electric machine, a provision to ignore brief fluctuations in the rotational speed does not necessarily have to be deactivated and a blockage signal can be output if the actual rotational speed of the electric machine is not increased even after the expiry of what is referred to as a debouncing time period of more than 2 s subsequent to the actuation.

In addition to the detection of a blocked electric machine, the possibility of decoupling the electric machine from the wheels by means of a clutch can also be used to carry out a more wide-ranging fault diagnosis. For example, the proposed method can be supplemented by virtue of the fact that when the clutch is closed a rotational speed of the electric machine is compared with the rotational speed of a wheel coupled to the electric machine. These two rotational speeds must normally be in a fixed ratio to one another. In the event of it being detected that these two rotational speeds are not in a fixed predefined ratio to one another, a drive train fault signal, which indicates a fault in the drive train between the electric machine and the driven wheel, can therefore be output. This drive train fault signal can in turn serve, within the monitoring device or after being passed on to other devices such as, for example, the driver assistance system, to trigger reactions to the presence of a defective drive train.

A control unit for an electric vehicle which is configured to carry out the method described above can have, inter alia, an input interface for inputting an actual rotational speed of the electric machine, an output interface for outputting a setpoint rotational speed to the electric machine, a monitoring device for monitoring the actual rotational speed signal, a control device for generating and outputting a setpoint rotational speed signal to the electric machine, and an output interface for outputting the blockage signal.

In order to be able to carry out the described method even in the event of there being no possible way of decoupling the electric machine from the wheels, the control unit should be able to monitor the actual rotational speed at very brief time intervals in order to be able to detect even brief changes in the rotational speed while the drive train is being made taut. Here, in the control unit there should be the possibility of being able to at least temporarily deactivate, where appropriate, an active provision to ignore brief fluctuations in the rotational speed during the normal operation of the electric machine.

In the event of the vehicle having a clutch in the drive train between the electric machine and the driven wheel, the control unit can also have an output interface for outputting a setpoint state signal for controlling a coupling state of the clutch. By outputting a suitable setpoint state signal it is therefore possible to decouple the electric machine selectively from the wheel when a non-rotating state of the electric machine is detected, and subsequently to monitor the reaction of the electric machine to an increased supply of power which is brought about by selective actuation.

It is to be noted that features and advantages of embodiments according to the invention are described here partially with respect to the proposed method and partially with respect to the proposed control unit. However, a person skilled in the art will recognize that the features can be combined with one another or transferred in an analogous fashion in various ways in order to achieve further advantages and synergy effects.

BRIEF DESCRIPTION OF THE DRAWINGS

Embodiments of the invention will be described below with respect to the appended drawings, wherein the description and the drawings should not be interpreted as restricting the invention.

The figures are merely schematic and are not true to scale. Identical or identically acting components are characterized with the same reference symbols in the figures.

DETAILED DESCRIPTION

Figure 1:
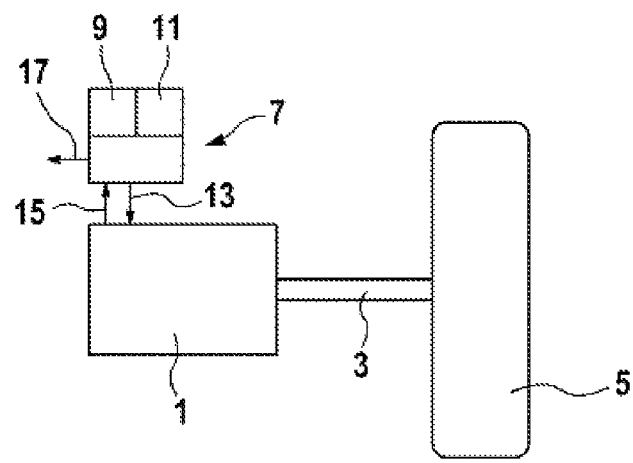
FIG. 1 shows a drive unit having an electric machine which is coupled in a largely rigid fashion to a wheel, and a control unit according to an embodiment of the present invention.

FIG. 1 shows a drive arrangement for an electric vehicle, in which drive arrangement an electric machine 1 is connected directly to a driven wheel 5 via a drive train 3. A control unit 7 has a monitoring device 9 for monitoring an actual rotational speed of the electric machine 1, and a control device 11 for generating and outputting a setpoint rotational speed to the electric machine 1. The actual rotational speed signal of the electric machine 1 can be input into the control unit 7 via an input interface 15. The setpoint rotational speed signal can be output to the electric machine 1 via an output interface 13. In addition, a blockage signal can be output via an output interface 17.

Figure 2:
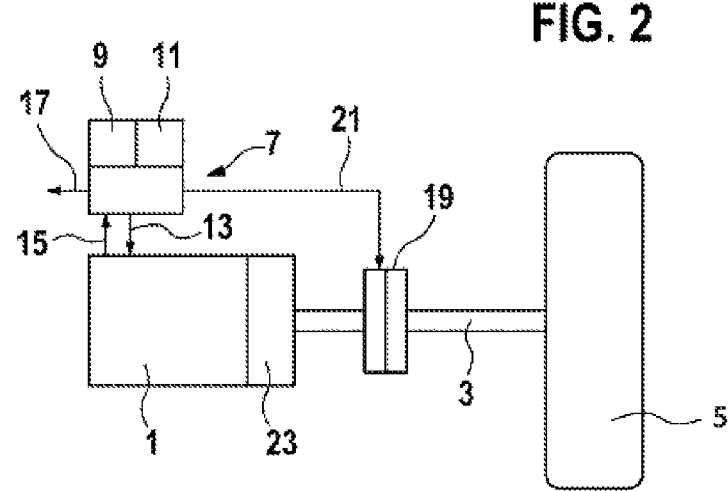
FIG. 2 shows a drive unit having an electric machine which is releasably connected to a wheel via a clutch, and a control unit according to an embodiment of the present invention.

In the case of the drive system illustrated in FIG. 2, a clutch 19, with which the wheel 5 can be optionally disconnected from the electric machine 1 or coupled thereto, is additionally provided between the electric machine 1 and the wheel 5 in the drive train 3. The control unit 7 also has an output interface 21 for outputting a setpoint state signal for controlling the coupling state of the clutch 19. In addition, the electric machine 1 is equipped with an optional transmission 23.

Figure 3:
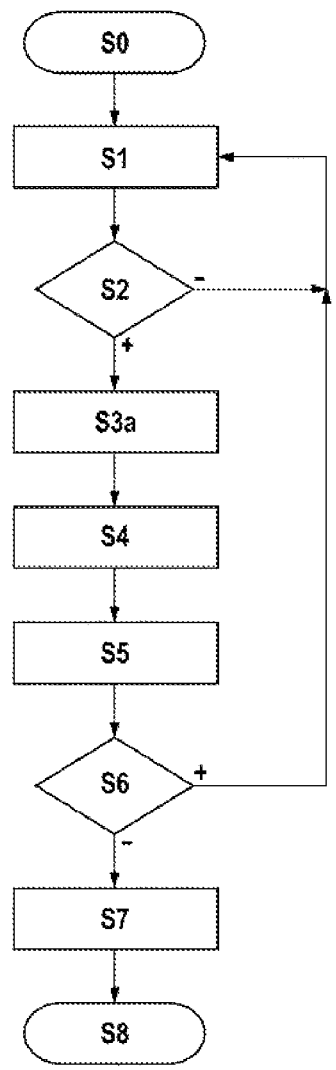
FIG. 3 shows a flowchart illustrating a method according to an embodiment of the present invention.

The flowchart illustrated in FIG. 3 illustrates a method such as can be used, in particular, in the clutch-free drive system illustrated in FIG. 1, to detect a blocked electric machine.

After initialization of a monitoring device (step S0), an actual rotational speed of the electric machine 1 is continuously monitored (step S1). If it is detected here (step S2) that the electric machine is in a non-rotating state, a provision which is provided for ignoring brief fluctuations in rotational speed during normal operation of the electric machine is firstly selectively deactivated (step S3a). Then, the electric machine is actuated to generate an increased torque (step S4), and said electric machine is monitored (step S5) as to how the actual rotational speed of the electric machine develops, that is to say how the electric machine reacts to the increased supply of power brought about as a result. If it is detected here (step S6) that the actual rotational speed of the electric machine increases at least for a brief time period after the targeted actuation, it is assumed that the electric machine is intact, and the increased actual rotational speed is prevented from being increased further or maintained, if need be by means of other external influences. The method then continues the monitoring of the actual rotational speed (step S1). However, if it is detected that the targeted actuation of the electric machine is not followed by an at least brief increase in the actual rotational speed, a defect in the electric machine and, in particular, blockage of the electric machine are assumed and a blockage signal is output (step S7) before the method is ended (step S8) or alternatively started from the beginning.

Figure 4:
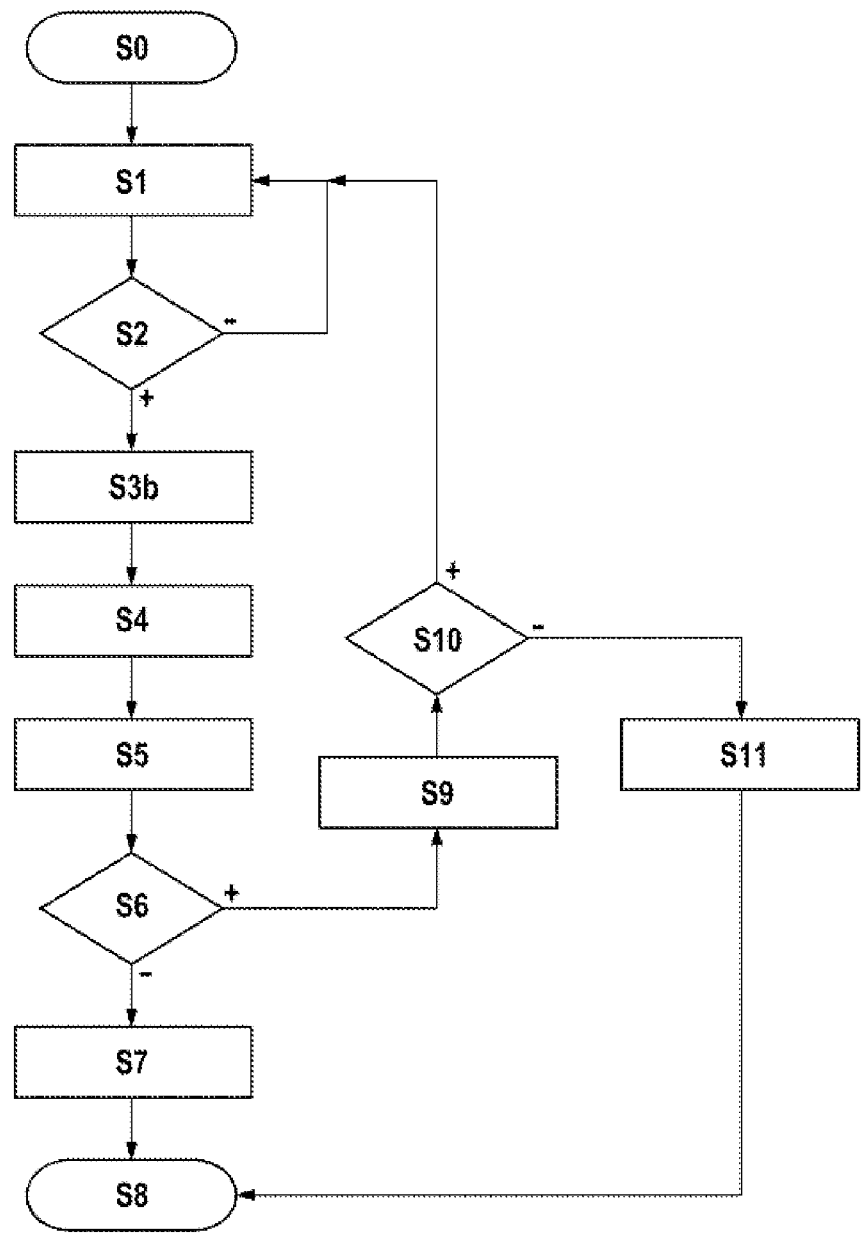
FIG. 4 shows a flowchart illustrating a method according to an alternative embodiment of the present invention.

The flowchart shown in FIG. 4 illustrates an alternative embodiment of a method in which blockage of the electric machine can be detected, in particular for the drive system which is illustrated in FIG. 2 and equipped with a clutch.

If, after initialization and monitoring of the actual rotational speed of the electric machine, it is detected (steps S0 to S2) that the electric machine is in a non-rotating state, the clutch 19 is firstly actuated to at least briefly disconnect (step S3b) a connection between the electric machine 1 and the wheel 5 which is to be driven. The electric machine is then actuated to generate an increased torque (step S4), and in turn it is monitored (step S5) whether the electric machine subsequently increases its rotational speed. If an increase in the rotational speed does not occur (step S6), a blockage signal is output (step S7) before the method is ended (step S8) or alternatively it is started from the beginning. If an increase in the rotational speed is detected (step S6), it is assumed that there is no blockage of the electric machine. Then, a state of the drive train is optionally checked in supplementary diagnostic steps. For this purpose, the clutch 19 is firstly actuated again to produce a connection between the electric machine 1 and the wheel 5 (step S9), and it is checked whether the actual rotational speed of the electric machine 1 is in a fixedly predefined ratio to the rotational speed of the wheel 5 coupled thereto. If this is not the case (step S10), a drive train fault signal is output (step S11). Otherwise, the monitoring of the actual rotational speed of the electric machine is continued (step S1).

With the proposed method and the proposed control unit it is possible to reliably detect blockage of the electric machine of an electric vehicle and to initiate corresponding countermeasures.

The invention claimed is:

1. A method for detecting a blocked electric machine (1) in an electric vehicle, the electric machine (1) connected via a releasable clutch (19) to at least one wheel (5) of the vehicle, wherein the method comprises:
    monitoring (S1) an actual rotational speed of the electric machine (1) and detecting (S2) if the electric machine (1) is in a non-rotating state; then
    actuating (S4) the electric machine (1) to generate an increased torque; then
    further monitoring (S5) of an actual rotational speed of the electric machine (1);
    outputting a blockage signal (S7) indicating a blocked electric machine if, during further monitoring, it is detected (S6) that the actual rotational speed of the electric machine (1) does not increase at least during a brief time period after the actuation (S4);
    actuating (S3b) the clutch (19) to disconnect the connection between the electric machine (1) and the wheel (5) after the detection (S2) of the non-rotating state; and
    monitoring (S5) an actual rotational speed of the electric machine (1) when the clutch (19) is disconnected;
    wherein the blockage signal is output (S7) only if the actual rotational speed of the electric machine does not increase after the expiry of a debouncing time period of more than 2 s subsequent to the actuation (S4).

2. The method as claimed in claim 1, wherein after the actuation (S4) the actual rotational speed is monitored (S5) at time intervals of less than 10 ms.

3. The method as claimed in claim 1, wherein the brief time period is a time period which a drive train (3) arranged between the electric machine (1) and a connected wheel (5) takes to become taut directly after the actuation (S4), owing to the increased torque.

4. The method as claimed in claim 3, wherein during the brief time period directly after the actuation (S4), an active provision to ignore brief fluctuations in rotational speed during the normal operation of the electric machine is deactivated (S3a).

5. The method as claimed in claim 1, wherein in addition when the clutch (19) is closed (S10), an actual rotational speed of the electric machine (1) is compared with a rotational speed of the wheel (5) which is coupled to the electric machine, and a drive train fault signal which indicates a fault in a drive train between the electric machine and the driven wheel is output (S11) if the rotational speed of the electric machine (1) is not in a fixedly predefined ratio with respect to the rotational speed of the wheel (5) which is coupled to the electric machine.

6. A control unit (7) for an electric vehicle, wherein the control unit is configured to carry out a method as claimed in claim 1.

7. The control unit as claimed in claim 6, wherein the control unit (7) comprises an input interface (15) for inputting an actual rotational speed signal of an electric machine (1), an output interface (13) for outputting a setpoint rotational speed signal to the electric machine (1), a monitoring device (9) for monitoring the actual rotational speed signal, a control device (11) for generating and outputting a setpoint rotational speed signal to the electric machine (1), and an output interface (17) for outputting the blockage signal.

8. The control unit as claimed in claim 6, wherein the control unit (7) also has an output interface (21) for outputting a setpoint state signal to control a coupling state of a clutch (19).

\* \* \* \* \*